US006441801B1

(12) United States Patent
Knight et al.

(10) Patent No.: US 6,441,801 B1
(45) Date of Patent: Aug. 27, 2002

(54) DEPLOYABLE ANTENNA USING SCREW MOTION-BASED CONTROL OF TENSEGRITY SUPPORT ARCHITECTURE

(75) Inventors: Byron F. Knight, Vienna, VA (US); Joseph Duffy; Carl David Crane, III, both of Gainesville, FL (US); Joseph Rooney, Olney (GB)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/539,630

(22) Filed: Mar. 30, 2000

(51) Int. Cl.[7] .................. H01Q 15/20; H01Q 15/14; H01Q 19/12
(52) U.S. Cl. .................. 343/915; 343/912; 343/840
(58) Field of Search .................. 343/912, 915, 343/916, 753, 755, 897, 877, 881, 882, 832, 834, 840

(56) References Cited

U.S. PATENT DOCUMENTS

| | | | |
|---|---|---|---|
| 4,030,102 A | 6/1977 | Kaplan et al. | 343/915 |
| 4,539,786 A | 9/1985 | Nelson | 52/645 |
| 4,655,022 A | 4/1987 | Natori | 51/646 |
| 4,667,451 A | 5/1987 | Onoda | 52/646 |
| 4,745,725 A | 5/1988 | Onoda | 52/646 |
| 4,771,585 A | 9/1988 | Onoda et al. | 52/646 |
| 4,796,033 A * | 1/1989 | Rubin et al. | 343/912 |
| 4,819,399 A | 4/1989 | Onoda | 52/646 |
| 4,825,225 A | 4/1989 | Waters et al. | 343/881 |
| 4,989,015 A * | 1/1991 | Chang | 343/915 |
| 5,016,418 A | 5/1991 | Rhodes et al. | 52/646 |
| 5,040,349 A | 8/1991 | Onoda et al. | 52/646 |
| 5,085,018 A | 2/1992 | Kitamura et al. | 52/108 |
| 5,167,100 A | 12/1992 | Krishnapillai | 52/109 |
| 5,642,590 A | 7/1997 | Skelton | 52/81.1 |
| 5,680,145 A * | 10/1997 | Thomson et al. | 343/915 |
| 6,195,067 B1 * | 2/2001 | Gilger | 343/915 |
| 6,268,835 B1 * | 7/2001 | Toland et al. | 343/781 P |

OTHER PUBLICATIONS

Duffy et al.: "Review of a family of self–deploying tensegrity structures with elastic ties", Shock and Vibration Digest, vol. 32, No. 2, 1–1 Mar. 2000, pp. 100–106, XP001035288.

Knight B. et al.: "Innovative deployable antenna developments using tensegrity design", 41st AIAA/ASME/ASCE/AHS/ASC Structures, Structural Dynamics, vol. 1, No. 2, 3–6 Apr. 2000, pp. 984–994, XP001035273.

"Two–Dimensional Deployable Hexapond Truss" by Onoda, Fu and Minesugi, Journal of Spacecraft and Rockets, vol. 33, No. 3, May–Jun. 1996, pp. 416–421.

(List continued on next page.)

Primary Examiner—Don Wong
Assistant Examiner—Chuc Tran D
(74) Attorney, Agent, or Firm—Allen, Dyer, Doppelt, Milbrath & Gilchrist, P.A.

(57) ABSTRACT

A screw motion-driven tensegrity antenna support architecture is configured to stably deploy and adjustably control an energy-focusing surface, such as an RF wave-reflecting conductive mesh. A parallel platform structure is configured of an upper hexagonal platform and a lower hexagonal base, the perimeter geometry of each of which is defined by plural interconnected tensioned ties. Vertices of the hexagonal tie base and the hexagonal upper tie platform are interconnected by pairs of legs, each including a compression strut and a tension tie. The stability of the structure requires that the sum of the tie tension forces matches the sum of the compression forces in the struts. To control deployment from a stowed condition and the geometric parameters of the deployed RF reflecting surface, a screw motion-based drive system is coupled to the struts to define relative mutual rotation and pitch between the upper platform and lower base.

18 Claims, 6 Drawing Sheets

OTHER PUBLICATIONS

"A Practical Quality Index Based on the Octahedral Manipulator" by Lee, Duffy and Hunt, The Journal of Robotics Research, vol. 17, No. 10, Oct. 1998, pp. 1081–1090.

"Mathematics and Tensegrity" by Robert Connelly and Allen Back, American Scientist, vol. 86, pp 142–151.

"Space Mission Analysis and Design", Wiley J. Larson and James R. Wertz, Second Edition, Space Technology Series, Space Technology Library, 1–6.

"An Introduction to Tensegrity", by Anthony Pugh, 22 pages.

"Structure in Nature is a Strategy for Design" by Peter Pearce, Introduction xii–xvii, pp. 2–9.

"NASA WTEC Panel Report on Global Satellite Communications Technology and Systems", Executive Summary, International Technology Research Institute World Technology (WTEC) Division, pp 1–16.

"Tetrobot—A Modular Approach to Reconfigurable Parallel Robotics" by Gregory J. Hamlin and Arthur C. Sanderson, Kluwer Academic Publishers, Tetrobot Overview, pp 1–33.

"Kinematic Analysis of Generalized Adaptive Trusses", by Tidwell, Reinholtz, Robertshaw, Horner, Kinematic Analysis of Generalized Adaptive Trusses, pp 772–791.

"Using Adaptive Structures to Enable Future Missions by Relaxing Ground Test Requirements", by Wada, Fanson and Chen, J. Spacecraft, vol. 28, No. 6, Nov.–Dec., 1991 pp 663–669.

"Evaluation Criteria for Conceptual Designs of Deployable–Foldable Truss Structures" by Dirk b. Warnaar, Lockheed Engineering and Sciences Company, Hampton, Virginia, DE–Vo146, Mechanical Design and Sysnthesis, ASME 1992, pp 167–174.

"Conceptual Design of Deployable–Foldable Truss Structures Using Graph Theory—Part 1: Graph Generation", by D.B. Warnaar and M. Chew, Department of Mechanical Engineering and Mechanics, Old Dominion University, Norfolk, Virginia, pp 107–113.

"Conceptual Design of Deployable–Foldable Truss Structures Using Graph Theory—Part 2: Generation of Deployable Truss Module Design Concepts" by D.B. Warnaar and M. Chew, Department of Mechanical Engineering and Mechanics, Old Dominion University, Norfolk, Virginia, pp 115–125.

"Multicriterion Preliminary Design of a Tetrahedral Truss Platform" by K. Chauncey Wu and Mark S. Lake, NASA Langley Research Center, Hampton, Virginia 23681–0001; Journal of Spacecraft and Rockets, vol. 33, No. 3, May–Jun., 1996, pp 410–415.

"An Analysis of Special Redundant Motions for a Square Platform", by Byron Knight, Jun., 1998, a correction to an Apr. 1998 paper submitted to Dr. Joseph Duffy, CIMAR, University of Florida, pp 1–9.

"An Investigation of some Special Motions of an Octahedron Manipulator Using Screw Theory" by J. Duffy et al, Center for Intelligent Machines and Robotics, pp 48–54 and references.

"A Classification and Optimization of Actuators for Space Deployment Mechanisms" by Dan Dubreuil Newman, A Thesis, Tuscaloosa, Alabama 1998, Background, pp 1–4, and Chapter 9, Conclusions, pp 103–107.

"A Treatise on the Theory of Screws" by Sir Robert Stawell Ball, Cambridge Mathematical Library, 9 pages.

"Displacement Control of Prestressed Structures" by Zhong You, Department of Engineering, University of Cambridge, Z. You Comput. Methods Appl. Mech. Engrg. 144 (1997), 51–59.

* cited by examiner

DEPLOYABLE ANTENNA USING SCREW MOTION-BASED CONTROL OF TENSEGRITY SUPPORT ARCHITECTURE

FIELD OF THE INVENTION

The present invention relates to energy focusing surfaces, such as radio wave antennas, solar concentrators, and the like and is particularly directed to a screw motion-driven tensegrity support architecture, that is configured to stably deploy and adjustably control characteristics of the energy-focusing surface.

BACKGROUND OF THE INVENTION

The field of deployable structures, such as space-deployed platforms, has matured significantly in the past decade. What once was a difficult art to master has been developed into a number of practical applications by commercial enterprises. The significance of this maturity has been the reliable deployment of various spacecraft-supported antenna systems, similar to that employed by the NASA tracking data and relay satellite (TDRS). In recent years, the development of parabolic, mesh-surface, reflector geometries has been accompanied by improvements in phased arrays (flat panel structures with electronically steered beams), both of which are critical to commercial and defense space programs. As commercial spacecraft production has exceeded military/civil applications, there is currently a demand for structural systems with proven reliability and performance, and the ever present reduced cost. As described in the text by Larson and Wertz, entitled "Space Mission Analysis and Design," Microcosm, Inc., ISBM: 1881883019; November 1992; 2nd Edition, a spacecraft system's requirements may be defined through a process of identifying broad objectives, reasonably achievable goals, and cost constraints. Although space missions vary greatly, and the requirements, goals, and costs associated with each task also vary greatly, one constraint is always present: "space is expensive."

The mission objective for a large, deployable space antenna is to provide reliable radio frequency (RF) energy reflection to an electronic collector (feed) located at the focus of the parabolic surface. The current state of deployable parabolic space antenna design is principally based on what may be termed a segmented construction approach which, as shown in FIGS. 1–4, is configured much like an umbrella. In this type of design, a plurality of radial ribs or segments 1 are connected to a central hub 3, that supports an antenna feed 5. A mechanical advantaged linear actuator (not shown) is used to drive the segments 1 from their stowed or unfurled condition, shown in the diagrammatic side and end views of FIGS. 1 and 2, into a locked, over-driven, position, so as to deploy a surface 7, as shown in the diagrammatic side and end views of FIGS. 3 and 4. A shortcoming of a single fold design of this type of antenna is the fact that the height of the stowed package is over one half of the deployed diameter. Other proposals include the use of hoop tensioners and mechanical memory surface materials.

To meet the above-stated objective, an analysis of mathematics and electrical engineering yields three fundamental parameters of the antenna: 1-defocus, 2-mispointing, and 3-surface roughness. As diagrammatically illustrated in FIG. 5, for a receiving antenna, defocus is defined as the error the surface of a reflector 10 that causes the received energy 12 to paint or be projected upon an area 14, rather than converge onto a focal point (where an antenna feed is placed). As shown in FIG. 6, mispointing corresponds to the misplacement of the converged energy 12 to a spatial position 16 other than the designed focal point 18. The third characteristic—surface roughness (or the approximation of a prescribed (e.g., parabolic) surface geometry), defines the reflector's ability to reflect and collect a given band of RF energy. Higher band reflectors require a more accurate surface that better approximates the theoretical parabola. Conversely, for a transmitting antenna, defocus produces divergent (rather than parallel) waves of energy from the reflector surface, while mispointing directs these waves in the wrong direction.

In recent years, numerous Defense Department organizations have solicited for new approaches to deployable antenna structures. The Air Force Research Laboratories (AFRL) are interested in solutions to aid with their Space Based Laser and Radar programs, and have requested new solutions to building precision deployable structures to support the optical and radar payloads. These requests are based upon the premise that the stowed density for deployable antennas can be significantly increased, while maintaining the reliability that the space community has enjoyed in the past. A failure of these structures is unacceptable. If the stowed volume can be reduced (therefore an increase in density for a given weight), launch services can be applied more efficiently.

The implementation of multiple vehicle launch platforms (e.g., the Iridium satellite built by Motorola) has presented a new case where the launch efficiency is a function of the stowed spacecraft package, and not the weight of the electronic bus. For extremely high frequency (EHF) systems (greater than 20 GHz) in low earth orbit (LEO), the antenna aperture needs to be only a few meters in diameter. However, for an L-band, geosynchronous orbit satellite (such AceS built by Lockheed Martin) the antenna aperture diameter is fifty feet. Less weight and payload drag must be achieved to ensure a more efficient assent into a geosynchronous orbit.

A relatively comprehensive study of the technology needs for future space systems to be published in the last decade was released by the International Technology Research Institute in a WTEC Panel Report entitled: "Global Satellite Communications Technology and Systems, Executive Summary," Nov. 11, 1998. This NSF/NASA sponsored research commissioned a panel of U.S. satellite engineers and scientists to study international satellite R&D projects to evaluate the long-term presence of the United States in this industry. A prior study was undertaken in 1992 to establish that there was significant activity in Europe and Asia that rivaled that of the U.S., and benchmarked this R&D to U.S. capability. The later study added market, regulatory, and policy issues in addition to the technology developments. The conclusion was that while the U.S. holds a commanding lead in the space marketplace, there are ongoing gains by both continents. This is evident in space launch, where Ariane Space has nearly achieved the capabilities of Boeing's (Delta) rocket services.

Once significant aspect of this study is that U.S. manufacturers are meeting their goals for short-term research (achieving program performance), but have greatly neglected the long-term goals, which has traditionally been funded by the government. A top candidate technologies include structural elements, materials and structures for electronic devices, and large deployable antennas (having diameters in excess of twenty-five meters). While there have been fourteen meter subsystems developed to meet geosynchronous system requirements during the 1990s, the large deployable requirement has yet to be addressed or developed.

Tetrobots have been developed in the last few years as a new approach to modular design. The tetrobot approach, which is described in the text by G. Hamlin et al, entitled: "TETROBOT, A Modular Approach to Reconfigurable Parallel Robotics," Kluwer Academic Publishers, 1998 (ISBN: 0-7923-8025-8) utilizes a system of hardware components, algorithms, and software to build various robotic structures to meet multiple design needs. These structures are Platonic Solids (tetrahedral and octahedral modules), with all the connections made with truss members. As described in the text by P. Tidwell et al, entitled: "Kinematic Analysis of Generalized Adaptive Trusses," First Joint U.S./Japan Conference on Adaptive Structures, Nov. 13-15, 1990, Technomic Publishing Co., pp. 772–791, adaptive trusses have been applied to the field of deployable structures, providing the greatest stiffness and strength for a given weight of any articulated structure or mechanism. Using the tetrahedron geometry (6-struts and 4-vertices) as its basis, the Tidwell et al text proposes a series of octahedral cells (12-struts and 6-vertices) to build an adaptive structure. An article by B. Wada et al, entitled: "Using Adaptive Structures to Enable Future Missions by Relaxing Ground Test Requirements, Journal of Spacecraft, Vol. 28, No. 6, November–December 1991, pp. 663-669 concludes that from well defined forward analyses (position, velocity and acceleration), this adaptive truss would be useful for deployed structures to remove position or motion errors caused by manufacturing, temperature change, stress, or external force.

The most complex issue in developing a reliable deployable structure design is the packaging of a light weight subsystem in as small a volume as possible, while ensuring that the deployed structure meets system requirements and mission performance. An article by D. Warnaar, entitled: Evaluation Criteria for Conceptual of Deployable-Foldable Truss Structures," ASME Design Engineering: Mechanical Design and Synthesis, Vol. 46, pp. 167–173, 1992, in describing criteria developed for deployable-foldable truss structures, addresses the issues of conceptual design, storage space, structural mass, structural integrity, and deployment. This article simplifies the concepts related to a stowed two-dimensional area deploying to a three-dimensional volume. A tutorial on deployable-foldable truss structures is presented in: "Conceptual Design of Deployable-Foldable Truss Structures Using Graph Theory-Part 1: Graph Generation," by D. Warnaar et al, ASME 1990 Mechanisms Conference, pp. 107–113, September 1990, and "Conceptual Design of Deployable-Foldable Truss Structures Using Graph Theory-Part 2: Generation of Deployable Truss Module Design Concepts, by D. Warnaar et al, ASME, 1990 Mechanisms Conference, pp. 115–125, September 1990. This series of algorithms presents a mathematical representation for the folded (three-dimensional volume in a two-dimensional area) truss, and aids in determining the various combinations for a folded truss design.

NASA's Langley Research Center has extensive experience in developing truss structures for space. One application, a 14-meter diameter, three-ring optical truss, was designed for space observation missions. An article by K. Wu et al, entitled: "Multicriterion Preliminary Design of a Tetrahedral Truss Platform," Journal of Spacecraft and Rockets, Vol. 33, No. 3, May–June 1996, pp. 410–415, details a design study that was performed using the Taguchi methods to define key parameters for a Pareto-optimal design: maximum structural frequency, minimum mass, and the maximum frequency to mass ratio. In the study, tetrahedral cells were used for the structure between two precision surfaces. 31 analyses were performed on 19,683 possible designs with an average frequency-to-mass ratio between 0.11 and 0.13 Hz/kg. This results in an impressive 22 to 26 Hz for a 200-kg structure.

The field of deployable space structures has proven to be both technically challenging and financially lucrative during the last few decades. Such applications as large parabolic antennas require extensive experience and tooling to develop, but is a key component to the growing personal communications market. Patents relating to deployable space structures have typically focused on the deployment of general truss network designs, rather than specific antenna designs. Some of these patents address new approaches that have not been seen in publication.

For example, the Kaplan et al, U.S. Pat. No. 4,030,102, and Waters et al, U.S. Pat. No. 4,825,225 describe the application of strut and tie construction to deployable antennas. However, the majority of patents address trusses and the issues associated with their deployment and minimal stowage volume. For example, the Nelson U.S. Pat. No. 4,539,786 describes a design for a three-dimensional rectangular volume based on an octahedron. Deployment uses a series of ties within the truss network, and details of the joints and hinges are described. When networked with other octahedral subsets, a compact stow package could be expanded into a rigid three-dimensional framework.

Other patents described continued work in expandable networks to meet the needs of International Space Station. For example, the Natori U.S. Pat. No,. 4,655,022, employs beams and triangular plates to form tetrahedral units that provide a linear truss. The patent details both joint and hinge details and the stowage and deployment kinematics. Similarly, the Kitamura et al, U.S. Pat. No. 5,085,018, describes a design based on triangular plates, hinged cross members, and ties to build expanding masts from very small packages.

A series of Onoda U.S. Pat. Nos. 4,667,451, 4,745,725, 4,771,585, 4,819,399 and 5,040,349 and an article by Onoda et al, entitled: "Two-Dimensional Deployable Hexapod Truss," Journal of Spacecraft and Rockets, Vol. 33, No. 3, May–June 1996, pp. 416-421, detail a number of examples of collapsible/deployable square truss units using struts and ties. Some suggested applications included box section, curved frames for building solar reflectors or antennas. The M. Rhodes et al, U.S. Pat. No. 5,016,418, describes a more practical design that uses no ties, but employs hinges to build a rectangular box from a tube stowage volume. In addition, the Krishnapillai U.S. Pat No. 5,167,100 and Skelton U.S. Pat. No. 5,642,590, describe the use of radial struts and strut/tie combinations, respectively.

SUMMARY OF THE INVENTION

In accordance with the present invention, advantage is taken of a highly stable structure, known as a tensegrity structure, to compactly stow, deploy and support an energy focusing surface, such as radio wave antenna, solar concentrator, and the like. In addition, through the use of a screw-motion based deployment and positioning drive of the struts of the tensegrity structure, the pitch and thereby the shape of the supported energy-focusing surface may be controllably adjusted, to facilitate compensating corrections for antenna defocus, mispointing, and surface roughness.

Pursuant to a non-limiting but preferred embodiment of the invention, a 6-6 platform structure for deploying and supporting an energy directing surface, such as a parabolic RF electromagnetic antenna, is configured such that the lowest energy state for the platform structure is in a screw-rotated 6-6 tensegrity position. The 6-6 parallel platform structure comprises an upper hexagonal platform and a lower hexagonal base, the perimeter geometry of each of which is defined by a plurality of interconnected tensioned ties. Vertices of the hexagonal tie base and the hexagonal upper tie platform are interconnected by a set of twelve legs, with a pair of legs extending from each vertex of a respective hexagonal platform/base tie set to adjacent vertices of the opposite hexagonal base/platform tie set. Each leg pair includes a compression member or strut and a tension member or tie. Namely, the twelve legs include six compression struts and an alternating set of six tensioned ties, so that opposite ends of each compression strut connect only to tensioned ties.

The stability of this 6-6 structure requires that the sum of the tie tension forces matches the sum of the compression forces in the struts. This structure provides six degrees of freedom, with the struts being controllably adjustable to establish parameters of an antenna surface subsystem that is supported by the 6-6 parallel platform. Since the geometry of each of the base and the platform is a hexagon, the radius from the center of the 6-6 parallel platform structure to the platform coordinates is equal to the length of the platform/base side. Using the base and platform geometries, Plucker line coordinates are calculated to define the length of the legs.

In order to control deployment from a stowed condition and the geometric parameters of the deployed structure, a screw motion-based based drive system is coupled to the struts to realize a relative z/θz motion or pitch p. The pitch, namely the separation between the upper platform and lower base, is defined as the ratio of linear z change to rotation about the z axis, which typically corresponds to the boresight axis of the antenna surface being deployed. A (parabolically) shaped reflective surface, such as a conductive mesh may be supported by an arrangement of cords and ties attached at a plurality of points along its circular perimeter to the six platform vertices of the 6-6 parallel platform structure, so that the operation of the struts will fully deploy the antenna into its intended geometry as the support structure is screw-driven from its stowed configuration to its tensegrity state.

Key parameters associated with successful operation of deployable antennas are defocus, mispointing, and surface roughness. Since the tensegrity structure of the present invention allows control of the component kinematics of the parallel platform structure, in particular the positioning of the six struts, 'tuning' adjustments to the positions of the struts may be made for any or all of these parameters to comply with a prescribed antenna performance specification. Defocus may be addressed by analysis of any 'cupping' of structural components, given the assumption that there are constant errors inherent in the antenna subsystem once deployed. For a given reflector surface a tolerance is established for an associated performance specification. The initial positions of the struts may be modified as necessary to control the geometry of the antenna reflector perimeter.

Mispointing deals with improper geometry of the surface causing the energy to be directed to the wrong (theoretical) focal point, although the focal point is actually a focal plane, due to energy management issues with RF transmitter/receivers. The ability to control the positions of the struts provides for surface geometry adjustment so as to direct the RF energy within the boundaries of this plane. The use of screw-based differential axial positioning of the platform relative to the base, which enables the antenna reflector surface to direct the RF energy toward respectively different foci. This enables different receiver feeds to be located in the vicinity of a nominal focal point, allowing different beams at different frequencies to be directed to these receivers.

Surface accuracy depends on properties of the reflective surface (e.g., reflective mesh), such as but not limited to non-linear stiffness, and reflective mesh surface material. Positioning and control of the reflector material through vernier adjustment of the strut support structure and/or the tensioning ties may be employed to provide compensation for properties of the surface material. The use of a minimum number of rigid elements (six compression struts) of the 6-6 tensegrity parallel platform structure of the invention also facilitates maximizing stowage density for a fixed spacecraft area or volume.

DETAILED DESCRIPTION

As pointed out above, the underlying architecture of the antenna support of the present invention is a 'tensegrity' structure, which is not only highly stable, but enjoys a substantial increase in stowed package density for space deployed antenna applications. In order to facilitate an appreciation of the use of a tensegrity-based support arrangement for deploying and controlling the characteristics of an energy focusing surface, such as but not limited to a parabolic antenna, which will described herein for purposes of providing an illustrative example, it is initially useful to examine the overall geometry and properties of a tensegrity structure.

The term 'tensegrity' is a kinematic approach to support structures derived from the two words 'tensile' and 'integrity'. It is described in an article by R. Connelly et al, entitled: "Mathematics and Tensegrity," American Scientist, Vol. 86, March–April 1998, pp. 142–151. Tensegrity was originally developed for architectural sculptures by K. Snelson in 1948. The tensegrity structure itself is described, for example, in the 1962 U.S. Pat. No. 3,063,521 to Fuller. A principal advantage of this type of design is that there is a minimum of compression elements (or struts); the stability of the tensegrity system is created through tension members (ties).

A simplification of Snelson's work is presented in the text by A. Pugh, entitled: "An Introduction to Tensegrity," University of California Press, Berkeley, Calif., 1976 (ISBN: 0-520-02996-8), beginning with a basic description of the attractions and forces in nature that govern everyday life, to applications in history of tensile and compressive members in buildings and ships, in order to achieve a balance between these forces to achieve the necessary structures for commerce and living. The introduction of Platonic solids presents the simplicity and art of tensile and compressive structures. The text by P. Pearce, entitled: "Structure in Nature is a Strategy for Design," MIT Press, Cambridge, Mass., 1990 (ISBN:0-262 –66045–8) describes the nature of structures and the discovery of the Platonic Solids. Plato was able to determine the nature of structures, and the structure of nature (a duality), by observing naturally occurring systems such as spider webs. Building on this work, Pearce was able to document more natural phenomenon (soap bubbles, Dragonfly wings, and cracked mud) to establish energy minimization during state change. The assumption here is that nature uses the most energy-efficient method. From these assumptions and an understanding of stress and strain in structural members (columns and beams), he was able to present a unique solution for simple, durable, high strength structures. From these conclusions, he proposed a family of residential, commercial, and industrial structures that are both aesthetically pleasing and functional.

Figure 1:
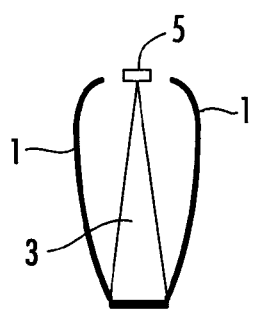
FIGS. 1 and 2 are respective diagrammatic side and end views of the stowed condition of a conventional segmented radial rib-based space-deployable parabolic antenna.
Figure 2:
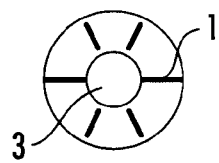
Figure 3:
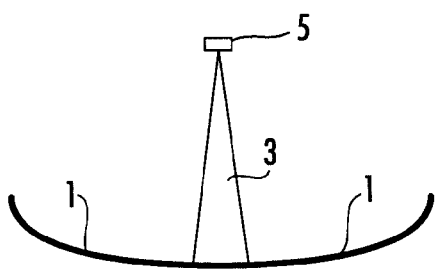
FIGS. 3 and 4 are respective diagrammatic side and end views of the deployed condition of the antenna of FIGS. 1 and 2.
Figure 4:
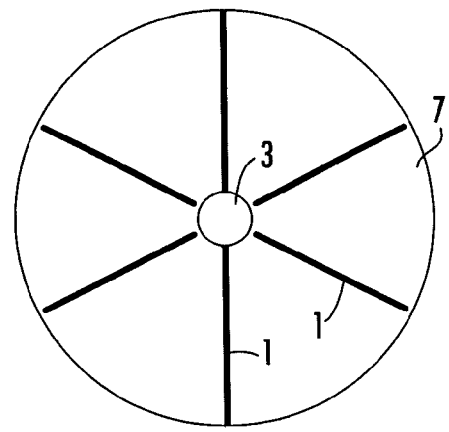
Figure 5:
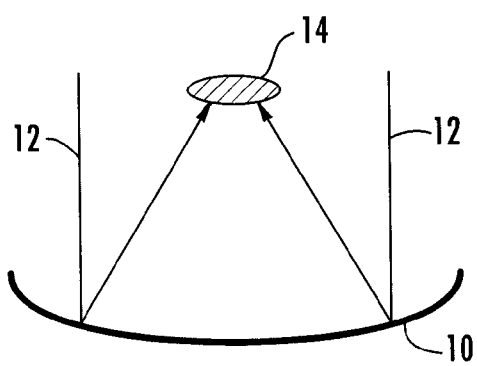
FIG. 5 diagrammatically illustrates the defocus of a reflector surface.
Figure 6:
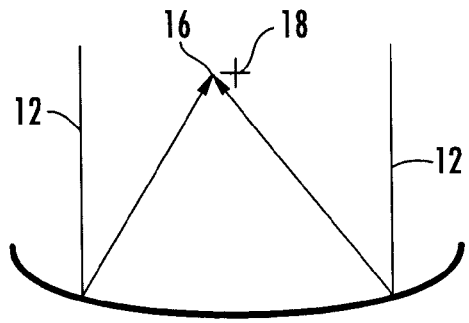
FIG. 6 diagrammatically illustrates mispointing of a reflector surface.
Figure 7:
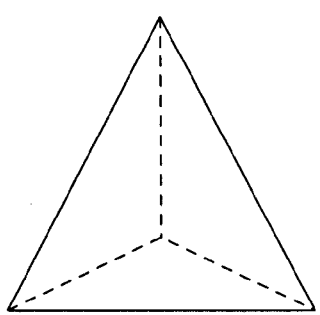
FIG. 7 shows a simple tetrahedron as a four-vertex, six-edged member structure.
Figure 8:
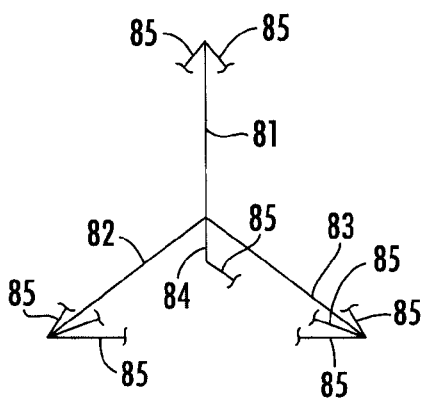
FIG. 8 shows an interior tripod system of four struts from which a tensegrity structure of the tetrahedron of FIG. 7 may be realized.
Figure 9:
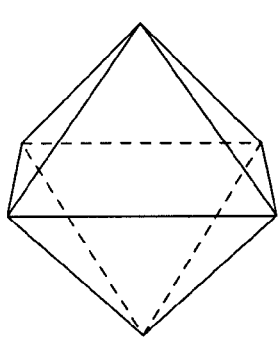
FIG. 9 shows a simple octahedron.
Figure 10:
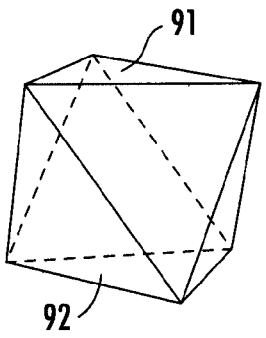
FIG. 10 shows the octahedron of FIG. 9 rotated about its center, producing a 3-3 platform structure.
Figure 11:
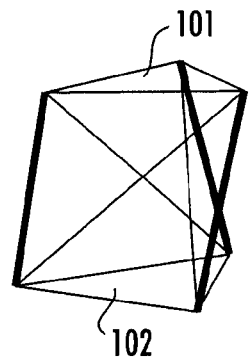
FIG. 11 shows the 3-3 octahedron of FIG. 10 with alternate ones of the six support struts thereof replaced by ties.

FIG. 7 shows a simple tetrahedron as a four-vertex, six-edged member structure, while FIG. 8 shows an interior (tripod) system of four struts 81–84, from which a tensegrity structure of the tetrahedron of FIG. 7 may be realized by connecting the four vertices of the struts with tensioned ties 85. FIG. 9 shows a simple octahedron (having 6-vertices, 12-edges, and 8-faces)—while FIG. 10 shows the octahedron of FIG. 9 rotated about its center, producing a 3-3 platform-like structure having a pair of upper and lower three-sided platforms 91 and 92, supported in parallel planes by six support struts therebetween. FIG. 11 shows the 3-3 platform-like octahedron of FIG. 10 with alternate ones of the six support struts thereof replaced by ties. From these illustrations, it can be seen that a deployable tensegrity structure may be realized using platform kinematic mathematics to manipulate the parallel struts between an upper platform and a lower base.

Pursuant to the present invention, a regular polygon-based platform structure for deploying and supporting an energy directing surface, such as a parabolic radio wave antenna, is configured such that the lowest energy state for the platform structure is in a tensegrity position. For purposes of providing a non-limiting illustrative example, the present invention will be described for the case of a regular six-polygon or hexagon for each of the platform and base of the tensegrity structure, corresponding to a '6-6' parallel platform architecture. It should be observed, however, that the invention is not limited to use with a polygon of a specific number of sides. In accordance with fundamental geometry principles, as the number of sides of the polygon is increased, the perimeter of the polygon tends acquire a more circular configuration. In terms of a practical implementation, a 6-6 structure provides a reasonable number of compression support members and connection points for a furlable reflective medium of which the antenna reflector surface is formed.

Figure 12:
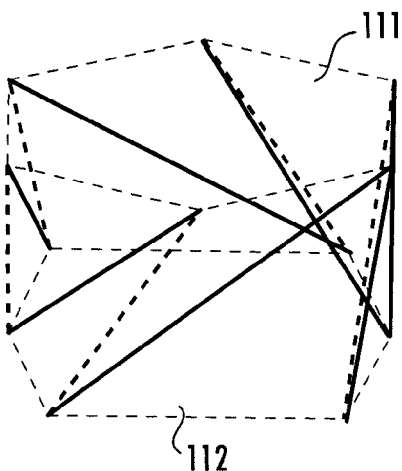
FIG. 12 is a diagrammatic perspective view of a tensegrity position of a hexagonal platform formed of a plurality of tensioned ties relative to a hexagonal base formed of a plurality of ties.

Attention is now directed to FIG. 12, which is a diagrammatic perspective view of the tensegrity position of a 6-6 structure for deploying a hexagonal platform 111 comprised of a plurality of tensioned ties, relative to a hexagonal base 112 also formed of a plurality of tensioned ties. In FIG. 12, broken lines represent (tensioned) ties and solid lines represent (compression) struts. The stability of this structure requires that the sum of the tie forces matches the sum of the compression forces in the struts that interconnect vertices of the platform 111 with the vertices of the base 113.

Figure 13:
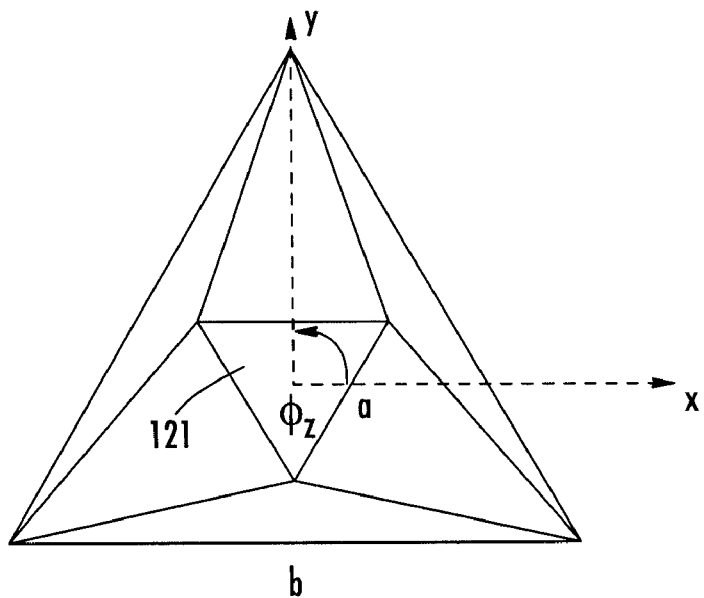
FIG. 13 diagrammatically illustrates a plan view of a 3-3 parallel platform.

An understanding of the 6-6 tensegrity platform structure of the invention may be facilitate by initially examining the geometric properties of a 3-3 parallel platform diagrammatically illustrated in the plan view of FIG. 13, and described for example, in an article by J. Lee et al, entitled: "A Practical Quality Index based on the Octahedral Manipulator," International Journal of Robotics Research, October 1998, pp. 1081–1090. The calculations for the quality index lambda for the 3-3 platform line coordinates is defined by a 6-6 matrix. The side length of the platform is 'a', the base is 'b', and the height of the (three-sided) platform 121 above the (three-sided) base 121 is 'h'. The determinate $|det\ J|$ for this 6-6 matrix (dividing by the nominal leg length to normalize the line coordinates) is readily calculated, as set forth in equation (1):

$$|det J| = \frac{3\sqrt{3}\, a^3 b^3 h^3}{4\left(\frac{a^2 - ab + b^2}{3} + h^2\right)^3} \tag{1}$$

By manipulating equation (1), differentiating the denominator with respect to h, and equating to zero (to get minimum/maximum values), a maximum h value is derived, as shown by equation (2):

$$h = h_m \sqrt{\frac{1}{3}(a^2 - ab + b^2)} \tag{2}$$

By substituting equation (2) into the original determinate, the maximum value $|det\ J|_m$ is obtained as set forth in equation (3):

$$|det J|_m = \frac{27 a^3 b^3}{32(a^2 - ab + b^2)^{\frac{3}{2}}} \tag{3}$$

A new expression for the maximum determinate is formed by substituting $b = \tau a$. Differentiating with respect to $\tau$ yields the maximum ratio of b/a and h/a: τ=b/a=2; h/a=1. These values are similar to those derived for the 6-6 platform, to be described below.

Figure 14:
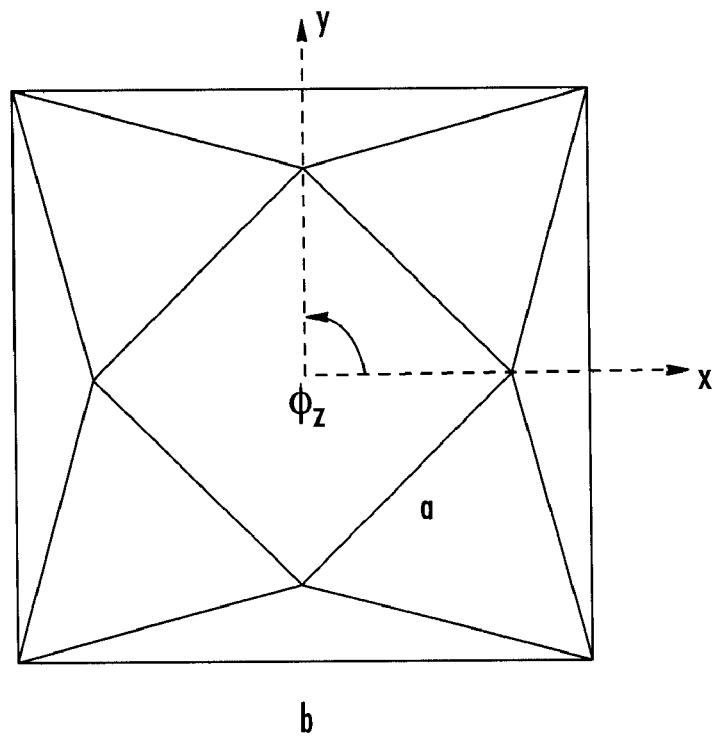
FIG. 14 shows a plan view of a 4-4 parallel platform as a square anti-prism.

FIG. 14 shows a plan view of a 4-4 parallel platform as a square anti-prism. (As described above, a 3-3 parallel platform is an octahedron; a 5-5 parallel platform is a pentagonal anti-prism.) The calculations of the quality index for a 4-4 parallel platform of FIG. 14 are similar to those for the 3-3 platform of FIG. 13. However, because the 4-4 line coordinates yield a 6×8 matrix, the determinate is not so easily calculated. To square the calculation, the index includes the product of the matrix and its transpose, as shown in equation (4).

$$\lambda = \sqrt{\frac{det J \cdot J^T}{det J_m \cdot J_m^T}} \qquad (4)$$

This method is derived from the Cauchy-Binet theorem, where $det J \cdot J^T = \Delta_1^2 + \Delta_2^2 + \ldots + \Delta_{nm}^2$. For any 6×n matrix this method applies. As with the 3-3 platform of FIG. 13, the determinate may be calculated as shown in equation (5):

$$\sqrt{det J \cdot J^T} = \frac{32\sqrt{2}\, a^3 b^3 h^3}{\left(a^2 - \sqrt{2}\, ab + b^2 + 2h^2\right)^3} \qquad (5)$$

Differentiating the denominator with respect to h yields the maximum value $h_m$, as set forth in equation (6).

$$h = h_m = \sqrt{\frac{1}{2}\left(a^2 - \sqrt{2}\, ab + b^2\right)} \qquad (6)$$

Using the τ method described above develops the ratios $\tau = b/a = 2^{1/2}; h/a = 2^{-1/2}$.

As described briefly above, a 6-6 parallel platform (hexagonal anti-prism) is the basis for this deployable antenna architecture of the present invention. Using the previously derived mathematics, similar quality index values are developed, so as to define the stability of the 6-6 structure once it is in an equilibrium position. As with the 4-4 platform of FIG. 14, the Cauchy-Binet theorem is used to determine the index. Once the mathematics is defined, details of the implementation of the 6-6 antenna will be described.

Figure 15:
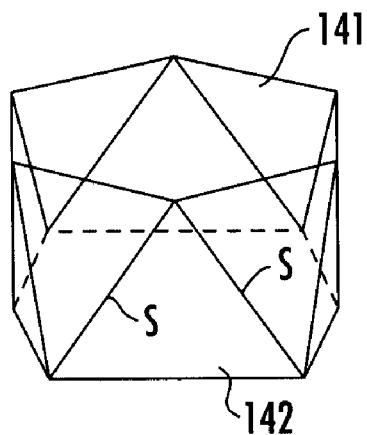
FIG. 15 shows a perspective view of a 6-6 parallel platform in a position rotationally offset from the tensegrity position of FIG. 12.

FIG. 15 shows a perspective view of a 6-6 parallel platform in a rotational position offset from the tensegrity position shown in FIG. 12, referenced above. As shown in FIG. 15, a 6-6 parallel platform has an upper hexagonal planar platform 141 formed of a plurality of tensioned ties 151 arrayed in parallel with a lower hexagonal planar base 142 formed of a plurality of tensioned ties 152. The vertices of the two hexagonal arrays are interconnected by a set of twelve generally vertical legs S half of which are comprise struts and half of which comprise tensioned ties. This structure provides six degrees of freedom, with the struts being controllably adjustable to establish parameters of an antenna surface subsystem supported by the 6-6 parallel platform, as will be described.

Figure 16:
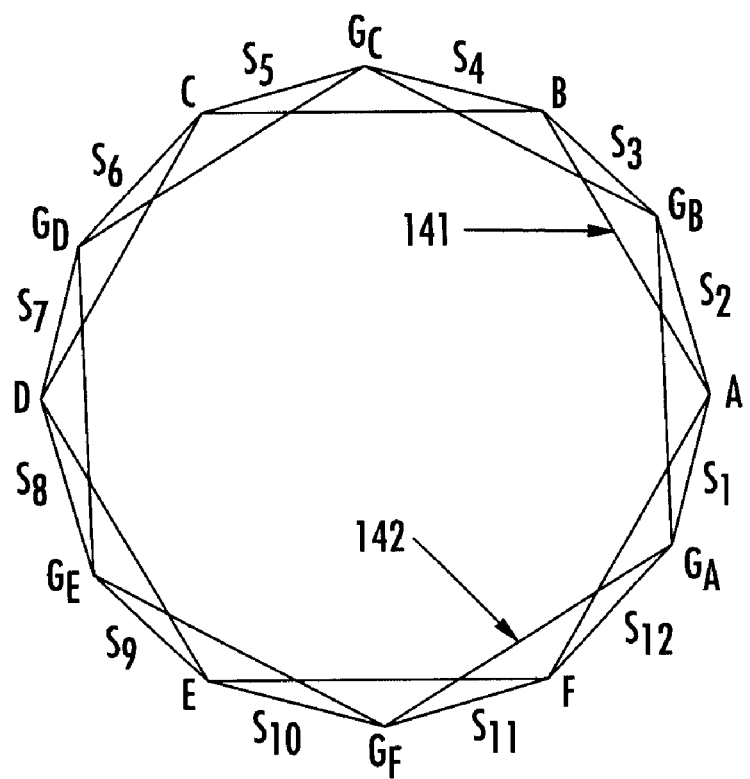
FIG. 16 is a plan view of the 6-6 parallel platform structure of FIGS. 12 and 15.

A plan view of the 6-6 parallel platform structure of FIGS. 12 and 15 is shown in FIG. 16. The coordinates of the vertices of the ties 151 of the platform 141 are A through F, while the coordinates of the vertices of ties 152 of the base 142 are denoted $G_A$ through $G_F$. The first truss segment is denoted as $S_1$ (heavy lines), and extends between (base) vertex $G_A$ and (platform) vertex A. Proceeding around the 6-6 parallel platform structure, the last or twelfth truss segment is $S_{12}$, extending between bases vertex F and platform vertex $G_A$. All of the base coordinates are fixed (no possible motions), and all z or vertical axis values are equal to zero (0). The values of the base coordinates are set forth in Appendix 1, while line coordinates for the platform vertices at the neutral position (the twelve legs are all the same nominal length) are set forth in Appendix 2.

From the above-referenced Lee et al article, and an article by B. Knight, entitled: "An Analysis of Special Redundant Motions for a Square Platform," CIMAR Paper, June 1998, a set of Plucker matrices may be defined as set forth in Appendix 3, to provide a set of (L, M, N, P, Q, R) Plucker coordinates for the twelve legs $S^{1-S12}$. The normalized Plucker coordinates were determined by dividing the calculated value by the nominal lengths of the legs for the neutral position, as defined by equation (7).

$$l = \frac{1}{2}\sqrt{4\left(a - \frac{\sqrt{3}\, b}{2}\right)^2 + b^2 + 4h^2} \qquad (7)$$

The J matrix, comprised of the Plucker coordinates for the twelve legs, is a 12×6 array, set forth in Appendix 4. The transpose $J^T$ is set forth in Appendix 5.

Equation (8) shows the calculation of the optimization value for the 6-6 J matrix (non-symmetric) is similar to that for the 4-4 platform solution which, like the 3-3 platform is known.

$$\Delta = \left[\frac{|J \cdot J^T|}{|J_{MAX} \cdot J_{MAX}^T|}\right]^{\frac{1}{2}} \qquad (8)$$

For this example, the product of the J and $J^T$ matrices is calculated, as in equation (9).

$$|J \cdot J^T| = 2916 \frac{a^6 b^6 h^6}{\left(a^2 - \sqrt{3}\, ab + b^2 + h^2\right)^6} \qquad (9)$$

As shown in equation (10), h is expressible as a function of a and b as:

$$h = h_m = \sqrt{a^2 - \sqrt{3}\, ab + b^2} \qquad (10)$$

Substituting equation (10) into the above yields equations (11) and (12) as:

$$|J_{MAX} \cdot J_{MAX}^T| = \frac{2916}{64} \frac{a^6 b^6}{\left(a^2 - \sqrt{3}\, ab + b^2\right)^3} \qquad (11)$$

$$\frac{|J \cdot J^T|}{|J_{MAX} \cdot J_{MAX}^T|} = 8h^3 \sqrt{\frac{\left(a^2 - \sqrt{3}\, ab + b^2\right)^3}{\left(-a^2 + \sqrt{3}\, ab - b^2 - h^2\right)^6}} \qquad (12)$$

This provides $\Delta$ as a function of a and b as:

$$\Delta = \frac{27}{4}\sqrt{\frac{a^6 b^6}{(a^2 - \sqrt{3}\,ab + b^2)^3}} \tag{13}$$

From equation (13) the optimized solution is calculated by substituting b=τa.

The combined matrices are simplified in equation (14) as:

$$|J_{MAX} \cdot J_{MAX}^T|^{\frac{1}{2}} = \frac{27a^3 y^3}{4[1-\sqrt{3}\,y+y^2]^{\frac{3}{2}}} = \frac{27a^3}{4\left[\frac{1}{y^2}-\frac{\sqrt{3}}{y}+1\right]^{\frac{3}{2}}} \tag{14}$$

Through differentiation with respect to τ, maximum and minimum values may be calculated, as shown in equation (15), yielding the solution for the most stable geometry for a 6-6 platform.

$$\frac{\partial}{\partial y}\left[\frac{1}{y^2}-\frac{\sqrt{3}}{y}+1\right]^{\frac{3}{2}} = \frac{3}{2}\left[\frac{1}{y^2}-\frac{\sqrt{3}}{y}+1\right]^{\frac{1}{2}}\left[\frac{-2}{y^3}+\frac{\sqrt{3}}{y^2}\right] = 0 \tag{15}$$

where $\tau = 2/3^{1/2} = b/a$; $h = a/3^{1/2}$; and $b = 2a/3^{1/2}$.

As described previously, the present invention manipulates the struts of the 6-6 parallel platform structure using a screw-motion based drive, in order to controllably adjust the twist and pitch of the tensegrity structure, and thereby deploy and tune one or more characteristics of the energy-focusing surface it supports. During this screw-motion based manipulation of the struts $S^1$–$S^{12}$, the lower base 143 remains fixed, while the upper platform 141, to which the perimeter of the antenna surface is attached, is rotated about thereby and axially displaced along the screw's z axis as it effectively moves along a screw of variable pitch h. Appendix 6 contains relationships associated with this screw motion of the geometry of an octahedron, as described by J. Duffy et al in "An Investigation of some Special Motions of an Octahedron Manipulator Using Screw Theory," publication in process, December 1997. Advantageously, this screw like motion is readily produced simply by imparting each strut with the same incremental increase or decrease in length. Continuity requires that the coordinates (about the circle defined) sum to zero. Namely, as shown in equations (16) and (17):

$$X_A + X_B + X_C + X_D + X_E + X_F = 0 \tag{16}$$

$$Y_A + Y_B + Y_C + Y_D + Y_E + Y_F = 0 \tag{17}$$

Similar to the above-referenced texts detailing octahedron and square platform papers, the radius from the center of the 6-6 parallel platform structure to the platform coordinates is equal to the length of the platform side. Using the base and platform coordinates previously defined, the Plucker line coordinates are calculated using Grassman's principle by counting the 2×2 determinants of each of the 2×4 arrays set forth in Appendix 7. The Plucker coordinates are defined by the determinants of Appendix 8. From these values, the transpose of Jacobian matrix of Appendix 9 may be obtained. The Plucker coordinates define the length of the legs for this structure, as set forth in Appendix 10.

Similarly, in the 6-6 parallel platform structure, adjacent legs are of equal length, and may be defined by equation (18) as:

$$l_e = \left(\left[a^2 - \sqrt{3}\,ab(\sin\phi_z + \cos\phi_z) + b^2 + h^2\right]\right)^{\frac{1}{2}} \tag{18}$$

Using the same principles, the screw motion of this structure is readily defined as set forth in equations (19) and (20) as:

$$\delta l = j^{*T} \delta D \tag{19}$$

$$\delta l_i = \hat{S}_i \cdot {}^T \delta D = \hat{S}_i \cdot {}^T \delta D / l_i \tag{20}$$

The values for the summation of the L, M, P, and Q coordinates are defined as set forth in Appendix 11 and are zero; the values of the N and R summations, which are also set forth in Appendix 11, are non-zero. The second pair of legs sum similarly, as set forth in equations (21)–(26).

$$L_2 + L_4 + L_6 + L_8 + L_{10} + L_{12} = 0 \tag{21}$$

$$M_2 + M_4 + M_6 + M_8 + M_{10} + M_{12} = 0 \tag{22}$$

$$P_2 + P_4 + P_6 + P_8 + P_{10} + P_{12} = 0 \tag{23}$$

$$Q_2 + Q_4 + Q_6 + Q_8 + Q_{10} + Q_{12} = 0 \tag{24}$$

$$N_2 + N_4 + N_6 + N_8 + N_{10} + N_{12} = 6h \tag{25}$$

$$R_2 + R_4 + R_6 + R_8 + R_{10} + R_{12} = 3br(3^{1/2}\sin\Phi_z + \cos\Phi_z) \tag{26}$$

For the odd leg 1°, adding the first, third, fifth, and seventh, ninth, and eleventh rows of the matrix and substituting the expressions for the coordinates yields equation (27), wherein z replaces the value for h.

$$6l_o \delta l_o = (N_1 + N_3 + N_5 + N_7 + N_9 + N_{11})\delta z + \tag{27}$$
$$(R_1 + R_3 + R_5 + R_7 + R_9 + R_{11})\delta\Phi$$
$$= 6z\delta z + 3br(3^{1/2}\sin\Phi_z + \cos\Phi_z), \text{ so that}$$
$$l_o \delta l_o = z\delta z + (br/2) * (3^{1/2}\sin\Phi_z + \cos\Phi_z)$$

The even leg calculation yields a similar result, as shown in equation (28).

$$l_e \delta l_e = z\delta z + (br/2)*(3^{1/2}\sin\Phi_z/\cos\Phi_z) \tag{28}$$

With half the number of legs (e.g., the odd legs ($S_1$, $S_3$, $S_5$, $S_7$, $S_9$, and $S_{11}$) replaced by tensioned ties, leaves the even numbered legs as struts ($S_2$, $S_4$, $S_6$, $S_8$, $S_{10}$, and $S_{12}$ which have no displacement). For this condition, the left side of each of equations (27) and (28) equals zero, and are therefore reduced to functions of only rotation and displacement, as shown in equation (29).

$$z\delta z = -(br/2)*(3^{1/2}\sin\Phi_z + \cos\Phi_z) \tag{29}$$

The pitch p is defined in equation (30) as the ratio of linear z change to rotation about the z axis.

$$p = \delta z / \delta\Phi_z \tag{30}$$

This yields the pitch equation (31)

$$p = \delta z/\delta \Phi_z = -(br/2z)*(3^{1/2} \sin \Phi_z + \cos \Phi_z) \quad (31)$$

The integration operation shown in equations (32) and (33) yields the z calculation, and demonstrates that the odd numbered legs can be controllably manipulated to realize a relative z/θz motion or pitch.

$$\int_{z_o}^{z} z \delta z = -\frac{br}{2} \int_0^{\Phi_z} [\sqrt{3} \sin\phi_z + \cos\phi_z] \delta\phi_z \quad (32)$$

$$z^2 = z_o - br\{3^{1/2}(\cos \Phi_z + 1) - \sin\Phi_z\} \quad (33)$$

Figure 17:
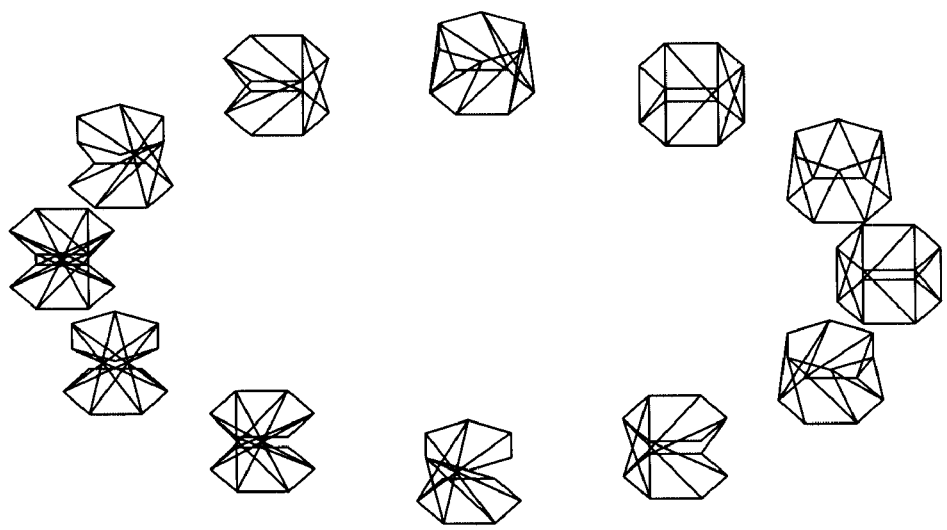
FIG. 17 shows successive conditions of rotation of the 6-6 parallel platform structure of FIGS. 15 and 16 through tensegrity.

FIG. 17 shows the rotation of the 6-6 parallel platform structure of FIGS. 15 and 16 through tensegrity. For the present example, every other (even numbered) leg of the structure is a strut, while the remaining (odd numbered) legs therebetween have been replaced by tensioned ties. As pointed out above, tensegrity occurs when all struts ($S_2$, $S_4$, $S_6$, $S_8$, $S_{10}$, and $S_{12}$) are in compression, and all ties ($S_1$, $S_3$, $S_5$, $S_7$, $S_9$, and $S_{11}$) are in tension. The struts ($S_2$, $S_4$, $S_6$, $S_8$, $S_{10}$, and $S_{12}$) cannot be in tension because they interface only with tensile members (ties 151 that form the six sides of platform 141, the ties 152 that form the six sides of platform 142, and ties $S_1$, $S_3$, $S_5$, $S_7$, $S_9$, and $S_{11}$).

Figure 19:
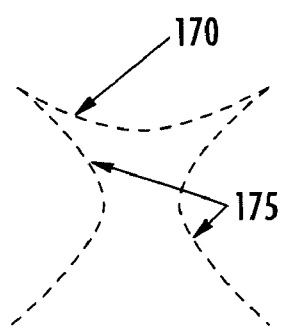
FIG. 19 is a side sectional broken line diagram of the structure of FIG. 18.
Figure 18:
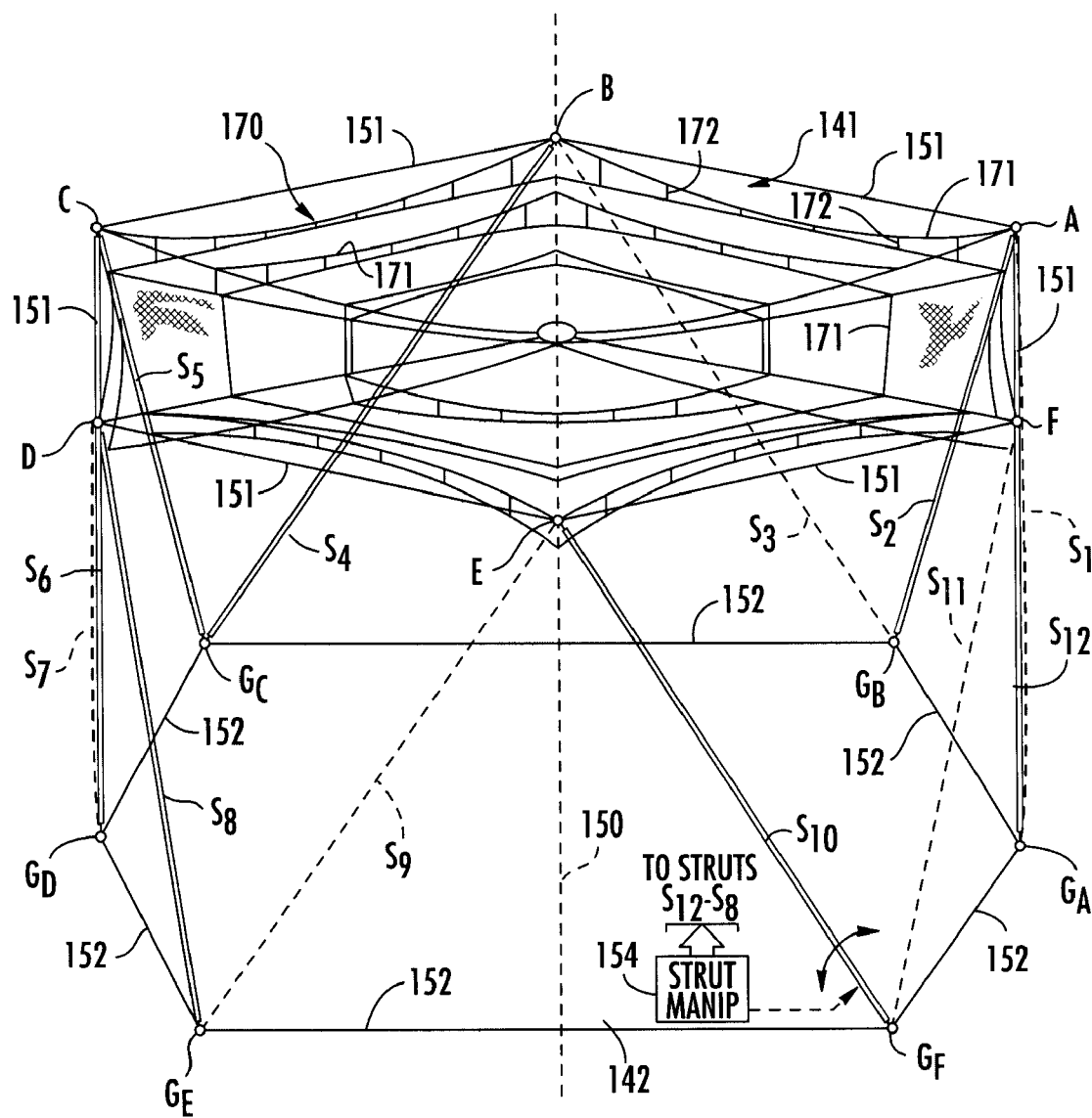
FIG. 18 diagrammatically illustrates a parabolically shaped reflective mesh attached at a plurality of points along its circular perimeter to the six platform vertices of a 6-6 parallel platform structure.

FIG. 18 diagrammatically illustrates a parabolically shaped reflective mesh 170 that is supported by an arrangement of cords 171 and ties 172, while FIG. 19 is a side sectional diagram of the structure of FIG. 18, showing in broken lines the manner in which the parabolic shape of the reflective mesh 170 of the antenna readily geometrically adjoins a stable hyperboloid shape 175 realized by the compression struts and ties of the tensegrity structure. The antenna mesh 170 may be readily attached to the 6-6 parallel platform structure by means of fasteners commonly employed for space-deployed structures, at a plurality of points along its circular perimeter to the six platform vertices A–F.

Each of the compression struts $S_2$, $S_4$, $S_6$, $S_8$, $S_{10}$, and $S_{12}$ is controllably, rotationally manipulated, as by means of electro-mechanically driven linkages coupled thereto from a strut manipulator subsystem 154, so as to perform a screw path motion about a central longitudinal axis 150. As described above, this screw path motion serves to change both the separation or spacing z between the upper tie platform 141 and the lower tie base 142, as well as their mutual differential rotation about the axis 150, and thereby deploys the structure and attached antenna mesh 170 from their stowed condition into their intended 'tensegrity state' geometry.

As described earlier, key parameters associated with successful operation of deployable (parabolic) antennas are defocus, mispointing, and surface roughness. Since the present invention allows control of the component kinematics of the parallel platform structure, in particular the positioning of the six compression struts ($S_2$, $S_4$, $S_6$, $S_8$, $S_{10}$, and $S_{12}$), 'tuning' adjustments of the struts may be made for any or all of these parameters to comply with a prescribed antenna performance specification.

The issue of defocus is addressed by analysis of any 'cupping' of structural components, given the assumption that there are constant errors inherent in the antenna subsystem once it is deployed. For a given reflector surface an associated tolerance is established for a characteristic design (e.g., an L-band commercial antenna which require a surface accuracy in the microns). The initial positions of the struts may be modified as necessary to control the geometry of the antenna reflector perimeter.

Mispointing, which deals with the problem of a improper geometry of the sufficient parabolic surface causing the energy to be directed to the wrong focal point. In reality the theoretical focal point is actually a focal plane, due to energy management issues with RF transmitter/receivers. The ability to control the positions of the struts provides for surface geometry adjustment so as to direct the RF energy within the boundaries of this plane.

Surface accuracy depends on properties of the reflective surface, such as but not limited to non-linear stiffness, and reflective mesh surface material. Positioning and control of the reflector material through vernier adjustment of the strut support structure and/or the tensioning ties may be employed to provide compensation for properties of the surface material. An article by Z. You, entitled: "Displacement control of prestressed structures," in Computer Methods in Applied Mechanics and Engineering, Volume 144, pp. 51–59, Mar. 15, 1997, describes tools for calculating motions of pre-stressed nodes by actuating flexible ties.

A particularly beneficial feature of the invention is the use of screw-based differential axial positioning of the platform relative to the base, which enables the antenna reflector surface to direct the RF energy toward respectively different foci. This enables different receiver feeds to be located in the vicinity of a nominal focal point, allowing different beams at different frequencies to be directed to these receivers.

Stowage within the envelope or shroud of the launch vehicle must also be considered along with the above issues of antenna performance. Currently, antenna subsystems are designed with one extra fold along the length of the struts. Nominally this means that a 20-meter diameter antenna would have a maximum stowed package density of approximately 5-meter height and several meters in diameter. The use of a minimum number of rigid elements (here, six struts, which may be configured as telescoping components) allows present day packaging schemes to maximize stowage density for a fixed spacecraft region (area or volume).

Figure 20:
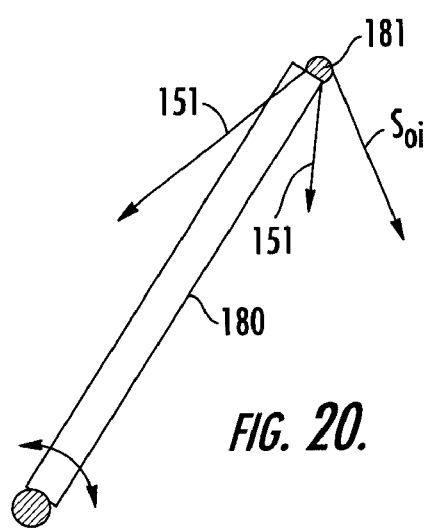
FIGS. 20 and 21 diagrammatically illustrate struts and ties deployed by a reel mounted to distal ends of a strut.
Figure 21:
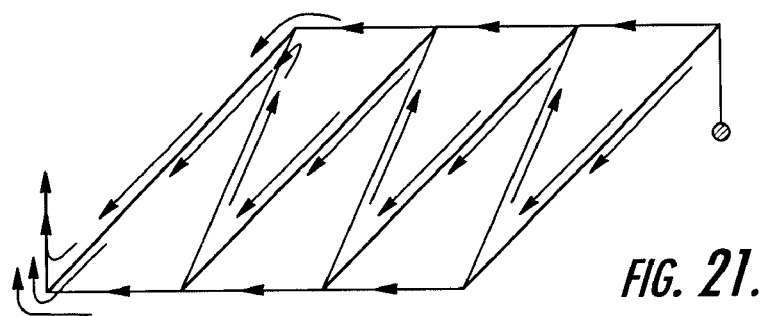

As diagrammatically illustrated in FIGS. 20 and 21, to facilitate compact stowage, the struts and ties may be deployed by means of a reel 181 mounted to the distal ends of a strut 180. The strut is configured as a hollow tube that is sized to receive and stow (three) ties (corresponding to an adjacent (odd) leg $S_{oi}$ and two connected ties 151 of the platform 141 ) that deploy from the within the strut proper along the arrow paths of FIG. 21. This simple, yet durable approach solves the problem of variable length ties for special antenna designs, such as those with multiple feed centers (focal points on the parabolic antenna surface). The base of the strut 180 is provided with a revolute joint 182 to ensure that there are only translational constraints.

As will be appreciated from the foregoing description, by taking advantage of the structural and stability properties of a tensegrity structure, the present invention is able to compactly stow, deploy and support an energy focusing surface, such as a furlable conductive material for a radio wave antenna. Moreover, by coupling the struts of the tensegrity structure to a screw-motion based deployment and positioning drive,, the pitch and thereby the shape of the supported energy-focusing surface may be controllably adjustable, so as to facilitate compensating corrections for defocus, mispointing, and surface roughness.

Appendix 1

$$G_A\left[\frac{\sqrt{3}\,b}{2}\quad -\frac{b}{2}\quad 0\right]\quad G_B\left[\frac{\sqrt{3}\,b}{2}\quad \frac{b}{2}\quad 0\right]\quad G_C[0\quad b\quad 0]$$

$$G_D\left[-\frac{\sqrt{3}\,b}{2}\quad \frac{b}{2}\quad 0\right]\quad G_E\left[-\frac{\sqrt{3}\,b}{2}\quad -\frac{b}{2}\quad 0\right]\quad G_F[0\quad -b\quad 0]$$

Appendix 2

$$A[a\quad 0\quad h]\quad B\left[\frac{a}{2}\quad \frac{\sqrt{3}\,a}{2}\quad h\right]\quad C\left[-\frac{a}{2}\quad \frac{\sqrt{3}\,a}{2}\quad h\right]$$

$$D[-a\quad 0\quad h]\quad E\left[-\frac{a}{2}\quad -\frac{\sqrt{3}\,a}{2}\quad h\right]\quad F\left[\frac{a}{2}\quad -\frac{\sqrt{3}\,a}{2}\quad h\right]$$

Appendix 3

$$S_1[G_A\quad A]:\begin{bmatrix}1 & \frac{\sqrt{3}\,b}{2} & -\frac{b}{2} & 0\\ 1 & a & 0 & h\end{bmatrix}$$

$$S_2[G_B\quad A]:\begin{bmatrix}1 & \frac{\sqrt{3}\,b}{2} & \frac{b}{2} & 0\\ 1 & \frac{a}{a} & 0 & h\end{bmatrix}$$

$$S_3[G_B\quad B]:\begin{bmatrix}1 & \frac{\sqrt{3}\,b}{2} & -\frac{b}{2} & 0\\ 1 & \frac{a}{2} & \frac{\sqrt{3}\,a}{2} & h\end{bmatrix}$$

$$S_4[G_C\quad B]:\begin{bmatrix}1 & 0 & b & 0\\ 1 & \frac{a}{2} & \frac{\sqrt{3}\,a}{2} & h\end{bmatrix}$$

$$S_5[G_C\quad C]:\begin{bmatrix}1 & 0 & b & 0\\ 1 & -\frac{a}{2} & \frac{\sqrt{3}\,a}{2} & h\end{bmatrix}$$

$$S_6[G_D\quad C]:\begin{bmatrix}1 & -\frac{\sqrt{3}\,b}{2} & \frac{b}{2} & 0\\ 1 & -\frac{a}{2} & \frac{\sqrt{3}\,a}{2} & h\end{bmatrix}$$

$$S_7[G_D\quad D]:\begin{bmatrix}1 & -\frac{\sqrt{3}\,b}{2} & \frac{b}{2} & 0\\ 1 & -a & 0 & h\end{bmatrix}$$

$$S_8[G_E\quad D]:\begin{bmatrix}1 & -\frac{\sqrt{3}\,b}{2} & -\frac{b}{2} & 0\\ 1 & -a & 0 & h\end{bmatrix}$$

$$S_9[G_E\quad E]:\begin{bmatrix}1 & -\frac{\sqrt{3}\,b}{2} & -\frac{b}{2} & 0\\ 1 & -\frac{a}{2} & -\frac{\sqrt{3}\,a}{2} & h\end{bmatrix}$$

$$S_{10}[G_F\quad E]:\begin{bmatrix}1 & 0 & -b & 0\\ 1 & -\frac{a}{2} & -\frac{\sqrt{3}\,a}{2} & h\end{bmatrix}$$

$$S_{11}[G_F\quad F]:\begin{bmatrix}1 & 0 & -b & 0\\ 1 & \frac{a}{2} & -\frac{\sqrt{3}\,a}{2} & h\end{bmatrix}$$

$$S_{12}[G_A\quad F]:\begin{bmatrix}1 & \frac{\sqrt{3}\,b}{2} & -\frac{b}{2} & 0\\ 1 & \frac{a}{2} & -\frac{\sqrt{3}\,a}{2} & h\end{bmatrix}$$

Appendix 4

$$\frac{1}{2^{12}l^{12}}\begin{bmatrix}2a-\sqrt{3}\,b & 2a-\sqrt{3}\,b & a-\sqrt{3}\,b & a & -a & -a+\sqrt{3}\,b\\ b & -b & \sqrt{3}\,a-b & \sqrt{3}\,a-2b & \sqrt{3}\,a-2b & \sqrt{3}\,a-b\\ 2h & 2h & 2h & 2h & 2h & 2h\\ -bh & bh & bh & 2bh & 2bh & bh\\ -\sqrt{3}\,bh & -\sqrt{3}\,bh & -\sqrt{3}\,bh & 0 & 0 & \sqrt{3}\,bh\\ ab & -ab & ab & -ab & ab & -ab\end{bmatrix}$$

$$\begin{bmatrix}-2a+\sqrt{3}\,b & -2a+\sqrt{3}\,b & -a+\sqrt{3}\,b & -a & a & a-\sqrt{3}\,b\\ -b & b & -\sqrt{3}\,a+b & -\sqrt{3}\,a+2b & -\sqrt{3}\,a+2b & -\sqrt{3}\,a+b\\ 2h & 2h & 2h & 2h & 2h & 2h\\ bh & -bh & -bh & -2bh & -2bh & -bh\\ \sqrt{3}\,bh & \sqrt{3}\,bh & \sqrt{3}\,bh & 0 & 0 & -\sqrt{3}\,bh\\ ab & -ab & ab & -ab & ab & -ab\end{bmatrix}$$

Appendix 5

$$\frac{1}{2^{12}l^{12}}\begin{bmatrix} 2a-\sqrt{3}\,b & b & 2h & -bh & -\sqrt{3}\,bh & ab \\ 2a-\sqrt{3}\,b & -b & 2h & bh & -\sqrt{3}\,bh & -ab \\ a-\sqrt{3}\,b & \sqrt{3}\,a-b & 2h & bh & -\sqrt{3}\,bh & ab \\ a & \sqrt{3}\,a-2b & 2h & 2bh & 0 & -ab \\ -a & \sqrt{3}\,a-2b & 2h & 2bh & 0 & ab \\ -a+\sqrt{3}\,b & \sqrt{3}\,a-b & 2h & bh & \sqrt{3}\,bh & -ab \\ -2a+\sqrt{3}\,b & -b & 2h & bh & \sqrt{3}\,bh & ab \\ -2a+\sqrt{3}\,b & b & 2h & -bh & \sqrt{3}\,bh & -ab \\ -a+\sqrt{3}\,b & -\sqrt{3}\,a+b & 2h & -bh & \sqrt{3}\,bh & ab \\ -a & -\sqrt{3}\,a+2b & 2h & -2bh & 0 & -ab \\ a & -\sqrt{3}\,a+2b & 2h & -2bh & 0 & ab \\ a-\sqrt{3}\,b & -\sqrt{3}\,a+b & 2h & -bh & -\sqrt{3}\,bh & -ab \end{bmatrix}$$

Appendix 6

$$X_A = r\cos(\phi_z)$$

$$Y_A = r\sin(\phi_z)$$

$$X_B = r\cos(\phi_z + 60°) = r\left(\frac{1}{2}\cos\phi_z - \frac{\sqrt{3}}{2}\sin\phi_z\right)$$

$$Y_B = r\sin(\phi_z + 60°) = r\left(\frac{1}{2}\sin\phi_z + \frac{\sqrt{3}}{2}\cos\phi_z\right)$$

$$X_C = r\cos(\phi_z + 120°) = -r\left(\frac{1}{2}\cos\phi_z + \frac{\sqrt{3}}{2}\sin\phi_z\right)$$

$$Y_C = r\sin(\phi_z + 120°) = -r\left(\frac{1}{2}\cos\phi_z - \frac{\sqrt{3}}{2}\sin\phi_z\right)$$

$$X_D = r\cos(\phi_z + 180°) = -r\cos\phi_z$$

$$Y_D = r\sin(\phi_z + 180°) = -r\sin\phi_z$$

$$X_E = r\cos(\phi_z + 240°) = -r\left(\frac{1}{2}\cos\phi_z - \frac{\sqrt{3}}{2}\sin\phi_z\right)$$

$$Y_E = r\sin(\phi_z + 240°) = -r\left(\frac{1}{2}\cos\phi_z + \frac{\sqrt{3}}{2}\sin\phi_z\right)$$

$$X_F = r\cos(\phi_z + 300°) = r\left(\frac{1}{2}\cos\phi_z + \frac{\sqrt{3}}{2}\sin\phi_z\right)$$

$$Y_F = r\cos(\phi_z + 300°) = r\left(\frac{1}{2}\cos\phi_z - \frac{\sqrt{3}}{2}\sin\phi_z\right)$$

Appendix 7

$$S_1[G_A\ A]:\begin{bmatrix} 1 & \frac{\sqrt{3}\,b}{2} & -\frac{b}{2} & 0 \\ 1 & X_A & Y_A & h \end{bmatrix}$$

$$S_2[G_B\ A]:\begin{bmatrix} 1 & \frac{\sqrt{3}\,b}{2} & \frac{b}{2} & 0 \\ 1 & X_A & Y_A & h \end{bmatrix}$$

$$S_3[G_B\ B]:\begin{bmatrix} 1 & \frac{\sqrt{3}\,b}{2} & \frac{b}{2} & 0 \\ 1 & X_B & Y_B & h \end{bmatrix}$$

$$S_4[G_C\ B]:\begin{bmatrix} 1 & 0 & b & 0 \\ 1 & X_B & Y_B & h \end{bmatrix}$$

$$S_5[G_C\ C]:\begin{bmatrix} 1 & 0 & b & 0 \\ 1 & X_C & Y_C & h \end{bmatrix}$$

$$S_6[G_D\ C]:\begin{bmatrix} 1 & -\frac{\sqrt{3}\,b}{2} & \frac{b}{2} & 0 \\ 1 & X_C & Y_C & h \end{bmatrix}$$

$$S_7[G_D\ D]:\begin{bmatrix} 1 & -\frac{\sqrt{3}\,b}{2} & \frac{b}{2} & 0 \\ 1 & X_D & Y_D & h \end{bmatrix}$$

$$S_8[G_E\ D]:\begin{bmatrix} 1 & -\frac{\sqrt{3}\,b}{2} & -\frac{b}{2} & 0 \\ 1 & X_D & Y_D & h \end{bmatrix}$$

$$S_9[G_E\ E]:\begin{bmatrix} 1 & -\frac{\sqrt{3}\,b}{2} & -\frac{b}{2} & 0 \\ 1 & X_E & Y_E & h \end{bmatrix}$$

$$S_{10}[G_F\ E]:\begin{bmatrix} 1 & 0 & -b & 0 \\ 1 & X_E & Y_E & h \end{bmatrix}$$

$$S_{11}[G_F\ F]:\begin{bmatrix} 1 & 0 & -b & 0 \\ 1 & X_F & Y_F & h \end{bmatrix}$$

$$S_{12}[G_A\ F]:\begin{bmatrix} 1 & \frac{\sqrt{3}\,b}{2} & -\frac{b}{2} & 0 \\ 1 & X_F & Y_F & h \end{bmatrix}$$

Appendix 8

$$\hat{S}_1^T = \left[\left(X_A - \frac{\sqrt{3}\,b}{2}\right)\ \left(Y_A + \frac{b}{2}\right)\ h;\ -\frac{bh}{2}\ -\frac{\sqrt{3}\,bh}{2}\ \frac{b}{2}(\sqrt{3}\,Y_A + X_A)\right]$$

$$\hat{S}_2^T = \left[\left(X_A - \frac{\sqrt{3}\,b}{2}\right)\ \left(Y_A - \frac{b}{2}\right)\ h;\ \frac{bh}{2}\ -\frac{\sqrt{3}\,bh}{2}\ \frac{b}{2}(\sqrt{3}\,Y_A - X_A)\right]$$

$$\hat{S}_3^T = \left[\left(X_B - \frac{\sqrt{3}\,b}{2}\right)\ \left(Y_B - \frac{b}{2}\right)\ h;\ \frac{bh}{2}\ -\frac{\sqrt{3}\,bh}{2}\ \frac{b}{2}(\sqrt{3}\,Y_B + X_B)\right]$$

$$\hat{S}_4^T = [X_B\ (Y_B - b)\ h;\ bh\ 0\ -bX_B]$$

-continued $$\hat{S}_5^T = [X_C \quad (Y_C - b) \quad h; \quad bh \quad 0 \quad -bX_C]$$

$$\hat{S}_6^T = \left[\left(X_C + \frac{\sqrt{3}\,b}{2}\right) \quad \left(Y_C - \frac{b}{2}\right) \quad h; \quad \frac{bh}{2} \quad \frac{\sqrt{3}\,bh}{2} \quad -\frac{b}{2}(\sqrt{3}\,Y_C + X_C)\right]$$

$$\hat{S}_7^T = \left[\left(X_D + \frac{\sqrt{3}\,b}{2}\right) \quad \left(Y_D - \frac{b}{2}\right) \quad h; \quad \frac{bh}{2} \quad \frac{\sqrt{3}\,bh}{2} \quad -\frac{b}{2}(\sqrt{3}\,Y_D + X_D)\right]$$

$$\hat{S}_8^T = \left[\left(X_D + \frac{\sqrt{3}\,b}{2}\right) \quad \left(Y_D + \frac{b}{2}\right) \quad h; \quad -\frac{bh}{2} \quad \frac{\sqrt{3}\,bh}{2} \quad -\frac{b}{2}(\sqrt{3}\,Y_D + X_D)\right]$$

$$\hat{S}_9^T = \left[\left(X_E + \frac{\sqrt{3}\,b}{2}\right) \quad \left(Y_E + \frac{b}{2}\right) \quad h; \quad -\frac{bh}{2} \quad \frac{\sqrt{3}\,bh}{2} \quad -\frac{b}{2}(\sqrt{3}\,Y_E - X_E)\right]$$

$$\hat{S}_{10}^T = [X_E \quad (Y_E + b) \quad h; \quad -bh \quad 0 \quad bX_E]$$

$$\hat{S}_{11}^T = [X_F \quad (Y_F + b) \quad h; \quad -bh \quad 0 \quad bX_F]$$

$$\hat{S}_{12}^T = \left[\left(X_F - \frac{\sqrt{3}\,b}{2}\right) \quad \left(Y_C + \frac{b}{2}\right) \quad h; \quad -\frac{bh}{2} \quad -\frac{\sqrt{3}\,bh}{2} \quad \frac{b}{2}(\sqrt{3}\,Y_F + X_F)\right]$$

Appendix 9

$$J^T = \begin{bmatrix}
\left(X_A - \frac{\sqrt{3}\,b}{2}\right) & \left(Y_A + \frac{b}{2}\right) & h & -\frac{bh}{2} & -\frac{\sqrt{3}\,bh}{2} & \frac{b}{2}(\sqrt{3}\,Y_A + X_A) \\
\left(X_A - \frac{\sqrt{3}\,b}{2}\right) & \left(Y_A - \frac{b}{2}\right) & h & \frac{bh}{2} & -\frac{\sqrt{3}\,bh}{2} & \frac{b}{2}(\sqrt{3}\,Y_A - X_A) \\
\left(X_B - \frac{\sqrt{3}\,b}{2}\right) & \left(Y_B - \frac{b}{2}\right) & h & \frac{bh}{2} & -\frac{\sqrt{3}\,bh}{2} & \frac{b}{2}(\sqrt{3}\,Y_B - X_B) \\
X_B & (Y_B - b) & h & bh & 0 & -bX_B \\
X_C & (Y_C - b) & h & bh & 0 & -bX_C \\
\left(X_C + \frac{\sqrt{3}\,b}{2}\right) & \left(Y_C - \frac{b}{2}\right) & h & \frac{bh}{2} & \frac{\sqrt{3}\,bh}{2} & -\frac{b}{2}(\sqrt{3}\,Y_C + X_C) \\
\left(X_D + \frac{\sqrt{3}\,b}{2}\right) & \left(Y_D - \frac{b}{2}\right) & h & \frac{bh}{2} & \frac{\sqrt{3}\,bh}{2} & -\frac{b}{2}(\sqrt{3}\,Y_D + X_D) \\
\left(X_D + \frac{\sqrt{3}\,b}{2}\right) & \left(Y_D + \frac{b}{2}\right) & h & -\frac{bh}{2} & \frac{\sqrt{3}\,bh}{2} & -\frac{b}{2}(\sqrt{3}\,Y_D - X_D) \\
\left(X_E + \frac{\sqrt{3}\,b}{2}\right) & \left(Y_E + \frac{b}{2}\right) & h & -\frac{bh}{2} & \frac{\sqrt{3}\,bh}{2} & -\frac{b}{2}(\sqrt{3}\,Y_E - X_E) \\
X_E & (Y_E + b) & h & -bh & 0 & bX_E \\
X_F & (Y_F + b) & h & -bh & 0 & bX_F \\
\left(X_F - \frac{\sqrt{3}\,b}{2}\right) & \left(Y_F + \frac{b}{2}\right) & h & -\frac{bh}{2} & -\frac{\sqrt{3}\,bh}{2} & \frac{b}{2}(\sqrt{3}\,Y_F + X_F)
\end{bmatrix}$$

Appendix 10

$$l_o = [L_o^2 + M_o^2 + N_o^2]^{\frac{1}{2}} = \left[\left(X_A - \frac{\sqrt{3}\,b}{2}\right)^2 + \left(Y_A + \frac{b}{2}\right)^2 + h^2\right]^{\frac{1}{2}}$$

$$= \left[X_A^2 - \sqrt{3}\,bX_A + \frac{3b^2}{4} + Y_A^2 + bY_A + \frac{b^2}{4} + h^2\right]^{\frac{1}{2}}$$

$$= \left[r^2\cos^2\phi_z - \sqrt{3}\,br\cos\phi_z + \frac{3b^2}{4} + r^2\sin^2\phi_z + br\sin\phi_z + \frac{b^2}{4} + h^2\right]^{\frac{1}{2}}$$

$$= [r^2 + \sqrt{3}\,br(\sin\phi_z - \cos\phi_z) + b^2 + h^2]^{\frac{1}{2}}$$

$$= [a^2 + \sqrt{3}\,ab(\sin\phi_z - \cos\phi_z) + b^2 + h^2]^{\frac{1}{2}}$$

Appendix 11

$$L_1 + L_3 + L_5 + L_7 + L_9 + L_{11} =$$

$$X_A - \frac{\sqrt{3}\,b}{2} + X_B - \frac{\sqrt{3}\,b}{2} + X_C + X_D + \frac{\sqrt{3}\,b}{2} + X_E + \frac{\sqrt{3}\,b}{2} + X_F =$$

$$r\cos\phi_z - \frac{\sqrt{3}\,b}{2} + r\left(\frac{1}{2}\cos\phi_z - \frac{\sqrt{3}}{2}\sin\phi_z\right) -$$

$$\frac{\sqrt{3}\,b}{2} - r\left(\frac{1}{2}\cos\phi_z + \frac{\sqrt{3}}{2}\sin\phi_z\right) - r\cos\phi_z + \frac{\sqrt{3}\,b}{2} -$$

$$r\left(\frac{1}{2}\cos\phi_z - \frac{\sqrt{3}}{2}\sin\phi_z\right) + \frac{\sqrt{3}\,b}{2} + r\left(\frac{1}{2}\cos\phi_z + \frac{\sqrt{3}}{2}\sin\phi_z\right) = 0$$

$$M_1 + M_3 + M_5 + M_7 + M_9 + M_{11} =$$

$$Y_A + \frac{b}{2} + Y_B - \frac{b}{2} + Y_C - b + Y_D - \frac{b}{2} + Y_E + \frac{b}{2} + Y_F + b =$$

$$r\sin\phi_z + \frac{b}{2} + r\left(\frac{1}{2}\cos\phi_z + \frac{\sqrt{3}}{2}\sin\phi_z\right) - \frac{b}{2} -$$

$$r\left(\frac{1}{2}\cos\phi_z - \frac{\sqrt{3}}{2}\sin\phi_z\right) - b - r\sin\phi_z - \frac{b}{2} -$$

$$r\left(\frac{1}{2}\cos\phi_z + \frac{\sqrt{3}}{2}\sin\phi_z\right) + \frac{b}{2} + r\left(\frac{1}{2}\cos\phi_z - \frac{\sqrt{3}}{2}\sin\phi_z\right) + b = 0$$

$$N_1 + N_3 + N_5 + N_7 + N_9 + N_{11} = 6h$$

$$P_1 + P_3 + P_5 + P_7 + P_9 + P_{11} = -\frac{bh}{2} + \frac{bh}{2} + bh + \frac{bh}{2} - \frac{bh}{2} + -bh = 0$$

$$Q_1 + Q_3 + Q_5 + Q_7 + Q_9 + Q_{11} =$$

$$-\frac{\sqrt{3}\,bh}{2} - \frac{\sqrt{3}\,bh}{2} + 0 + \frac{\sqrt{3}\,bh}{2} + \frac{\sqrt{3}\,bh}{2} + 0 = 0$$

$$R_1 + R_3 + R_5 + R_7 + R_9 + R_{11} =$$

$$\frac{b}{2}(\sqrt{3}\,Y_A + X_A) + \frac{b}{2}(\sqrt{3}\,Y_B - X_B) - bX_C - \frac{b}{2}(\sqrt{3}\,Y_D + X_D) -$$

$$\frac{b}{2}(\sqrt{3}\,Y_E - X_E) + bX_F = \frac{br}{2}(\sqrt{3}\,\sin\phi_z + \cos\phi_z) +$$

$$\frac{br}{2}\left[\left(\frac{\sqrt{3}}{2}\sin\phi_z + \frac{3}{2}\cos\phi_z\right) - \left(\frac{1}{2}\cos\phi_z - \frac{\sqrt{3}}{2}\sin\phi_z\right)\right] +$$

$$br\left(\frac{1}{2}\cos\phi_z + \frac{3}{2}\sin\phi_z\right) + \frac{br}{2}(\sqrt{3}\,\sin\phi_z + \cos\phi_z)$$

$$\frac{br}{2}\left[\left(\frac{\sqrt{3}}{2}\sin\phi_z + \frac{3}{2}\cos\phi_z\right) - \left(\frac{1}{2}\cos\phi_z - \frac{\sqrt{3}}{2}\sin\phi_z\right)\right] +$$

$$br\left(\frac{1}{2}\sin\phi_z + \frac{\sqrt{3}}{2}\cos\phi_z\right) = 3br(\sqrt{3}\,\sin\phi_z + \cos\phi_z)$$

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. A method of deploying an antenna comprising the steps of:
   (a) providing a furlable radio wave-reflective material which when unfurled, deploys to a prescribed antenna surface geometry;
   (b) coupling said material to a structure that is adapted to be configured into a tensegrity condition, such that, when placed in said tensegrity condition, said structure deploys said furlable radio wave-reflective material to said prescribed antenna surface geometry; and (c) placing said structure in said tensegrity condition, so as to cause said furlable radio wave-reflective material to deploy to said prescribed antenna surface geometry.

2. A method according to claim 1, wherein step (c) comprises imparting a screw-motion to said structure to place said structure in said tensegrity condition, and thereby cause said furlable radio wave-reflective material to deploy to said prescribed antenna surface geometry.

3. A method according to claim 1, wherein said structure comprises a first tension member-configured polygon and a second tension member-configured polygon spaced in parallel relation to said first polygon, and wherein vertices of said first polygon are coupled by tension and compression members to vertices of said second polygon.

4. A method according to claim 3, wherein step (c) comprises imparting a screw-motion to said compression members and thereby place said structure in said tensegrity condition.

5. A method according to claim 3, wherein each vertex of said first polygon is respectively connected by a tension member and a compression member to adjacent vertices of said second polygon, and wherein each vertex of said second polygon is respectively connected by a tension member and a compression member to adjacent vertices of said first polygon, so that compression members alternate with tension members between said first and second polygons, with opposite ends of each compression member connecting only to tension members, and wherein placing said structure in said tensegrity condition in step (c) causes the sum of the tension forces in said tension members to match the sum of compression forces in said compression members.

6. A method according to claim 5, wherein each of said first and second polygons comprises a hexagon.

7. A method according to claim 4, wherein step (c) comprises imparting a screw-motion to said compression members to effect axial displacement with mutual relative rotation between said first and second tension member-configured polygons, and thereby place said structure in said tensegrity condition.

8. An antenna comprising:
a structure that is adapted to be configured into a tensegrity condition; and
a furlable radio wave-reflective material which, when unfurled, deploys to a prescribed antenna surface geometry, said furlable radio wave-reflective material being coupled to said structure such that, when said structure is configured into said tensegrity condition, said structure deploys said furlable radio wave-reflective material to said prescribed antenna surface geometry.

9. An antenna according to claim 8, further including a structure manipulator which is operative to impart a screw-motion to said structure that brings said structure to said tensegrity condition, and thereby causes said furlable radio wave-reflective material to deploy to said prescribed antenna surface geometry.

10. An antenna according to claim 8, wherein said structure includes a first tension member-configured polygon and a second tension member-configured polygon spaced in parallel relation to said first polygon, vertices of said first polygon being coupled by tension and compression members to vertices of said second polygon.

11. An antenna according to claim 10, wherein said structure manipulator operative to impart said screw-motion to said compression members and thereby place said structure in said tensegrity condition.

12. An antenna according to claim 10, wherein each vertex of said first polygon is respectively connected by a tension member and a compression member to adjacent vertices of said second polygon, and wherein each vertex of said second polygon is respectively connected by a tension member and a compression member to adjacent vertices of said first polygon, so that compression members alternate with tension members between said first and second polygons, with opposite ends of each compression member connecting only to tension members, and wherein in the tensegrity condition of said structure, the sum of the tension forces in said tension members match the sum of compression forces in said compression members.

13. An antenna according to claim 12, wherein each of said first and second polygons comprises a hexagon.

14. An antenna according to claim 11, wherein said structure manipulator is operative to impart said screw-motion to said compression members so to effect axial displacement with mutual relative rotation between said first and second tension member-configured polygons, and thereby place said structure in said tensegrity condition.

15. An energy directing apparatus comprising:
an arrangement of tension and compression members that is adapted to be placed in a tensegrity condition; and
an energy focusing material, which is deployable to a prescribed energy-directing surface geometry, and is coupled to said arrangement such that, when said arrangement of tension and compression members is placed in said tensegrity condition, said energy focusing material deploys to said prescribed surface geometry, and
a compression member manipulator which is operative to impart screw-motion to said compression members to effect axial displacement with mutual relative rotation between said first and second tension member-configured polygons, that brings said arrangement of tension and compression members to said tensegrity condition, and thereby causes said energy focusing material to deploy to said prescribed antenna surface geometry.

16. An energy directing apparatus according to claim 15, wherein said arrangement includes a first tension member-configured polygon and a second tension member-configured polygon spaced in parallel relation to said first polygon, vertices of said first polygon being coupled by tension and compression members to vertices of said second polygon.

17. An energy directing apparatus according to claim 16, wherein each vertex of said first polygon is respectively connected by a tension member and a compression member to adjacent vertices of said second polygon, and wherein each vertex of said second polygon is respectively connected by a tension member and a compression member to adjacent vertices of said first polygon, so that compression members alternate with tension members between said first and second polygons, with opposite ends of each compression member connecting only to tension members, and wherein in the tensegrity condition of said arrangement, the sum of the tension forces in said tension members match the sum of compression forces in said compression members.

18. An energy directing apparatus according to claim 17, wherein each of said first and second polygons comprises a hexagon.

* * * * *

UNITED STATES PATENT AND TRADEMARK OFFICE
CERTIFICATE OF CORRECTION

PATENT NO. : 6,441,801 B1
DATED : August 27, 2002
INVENTOR(S) : Byron F. Knight et al.

It is certified that error appears in the above-identified patent and that said Letters Patent is hereby corrected as shown below:

Column 2,
Line 59, delete "the government. A top candidate" insert -- the government. Top candidate --

Column 4,
Line 24, delete "the needs of International" insert -- the needs of the International --

Column 8,
Line 12, delete "polygon tends acquire" insert -- polygon tends to acquire --
Line 29, delete "may be facilitate by" insert -- may be facilitated by --
Line 55, delete
(Equation 2)

$$" h = h_m \sqrt{\frac{1}{3}(a^2 - ab + b^2)} \;"$$

Insert:

$$-- h = h_m = \sqrt{\frac{1}{3}(a^2 - ab + b^2)} \;--$$

Column 9,
Line 45, delete "mathematics is defined," insert -- mathematics are defined, --
Line 56, delete "half of which are comprise" insert -- half of which comprise --

Column 10,
Line 15, delete "legs $S^{1-S12}$. The" insert -- legs $S^1 - S^{12}$. The --

UNITED STATES PATENT AND TRADEMARK OFFICE
CERTIFICATE OF CORRECTION

PATENT NO. : 6,441,801 B1
DATED : August 27, 2002
INVENTOR(S) : Byron F. Knight et al.

It is certified that error appears in the above-identified patent and that said Letters Patent is hereby corrected as shown below:

Column 11,
Line 12, (Equation 14)    Delete:

$$ \left| J_{MAX} \cdot J_{MAX}^T \right|^{\frac{1}{2}} = \frac{27a^3 y^3}{4[1 - \sqrt{3}y + y^2]^{\frac{3}{2}}} = \frac{27a^3}{4\left[ \frac{1}{y^2} - \frac{\sqrt{3}}{y} + 1 \right]^{\frac{3}{2}}} $$

Insert:

$$ \left| J_{MAX} \cdot J_{MAX}^T \right|^{\frac{1}{2}} = \frac{27a^3 \gamma^3}{4[1 - \sqrt{3}\gamma + \gamma^2]^{\frac{3}{2}}} = \frac{27a^3}{4\left[ \frac{1}{\gamma^2} - \frac{\sqrt{3}}{\gamma} + 1 \right]^{\frac{3}{2}}} $$

Line 23, (Equation 15)    Delete:

$$ \frac{\partial}{\partial y}\left[ \frac{1}{y^2} - \frac{\sqrt{3}}{y} + 1 \right]^{\frac{3}{2}} = \frac{3}{2}\left[ \frac{1}{y^2} - \frac{\sqrt{3}}{y} + 1 \right]^{\frac{1}{2}} \left[ \frac{-2}{y^3} + \frac{\sqrt{3}}{y^2} \right] = 0 $$

Insert:

$$ \frac{\partial}{\partial \gamma}\left[ \frac{1}{\gamma^2} - \frac{\sqrt{3}}{\gamma} + 1 \right]^{\frac{3}{2}} = \frac{3}{2}\left[ \frac{1}{\gamma^2} - \frac{\sqrt{3}}{\gamma} + 1 \right]^{\frac{1}{2}} \left[ \frac{-2}{\gamma^3} + \frac{\sqrt{3}}{\gamma^2} \right] = 0 $$

Column 12,
Line 7, (Equation 18)    Delete:

$$ l_e = \left( [a^2 - \sqrt{3}ab(\sin\phi_z + \cos\phi_z) + b^2 + h^2] \right)^{\frac{1}{2}} $$

Insert:

$$ l_e = [a^2 - \sqrt{3}ab(\sin\phi_z + \cos\phi_z) + b^2 + h^2]^{\frac{1}{2}} $$

UNITED STATES PATENT AND TRADEMARK OFFICE
CERTIFICATE OF CORRECTION

PATENT NO. : 6,441,801 B1  Page 3 of 5
DATED : August 27, 2002
INVENTOR(S) : Byron F. Knight et al.

It is certified that error appears in the above-identified patent and that said Letters Patent is hereby corrected as shown below:

Column 12,
Line 42, (Line 2 of Equation 27)

Delete:
" $(R_1 + R_3 + R_5 + R_7 + R_9 + R_{11})\delta\Phi$ "

Insert:
-- $(R_1 + R_3 + R_5 + R_7 + R_9 + R_{11})\delta\Phi_z$ --

Line 51, (Equation 28)

Delete:
" $l_e \delta l_e = z\delta z + (br/2)*(3^{\frac{1}{2}} \sin\Phi_z / \cos\Phi_z)$ "

Insert:
-- $l_e \delta l_e = z\delta z + (br/2)*(3^{\frac{1}{2}} \sin\Phi_z - \cos\Phi_z)$ --

Column 13,
Line 13, (Equation 33)

Delete:
" $z^2 = z_o\_br\{3^{\frac{1}{2}}(\cos\Phi_z + 1) - \sin\Phi_z\}$ "

Insert:
-- $z^2 = z_o - br\{3^{\frac{1}{2}}(\cos\Phi_z + 1) - \sin\Phi_z\}$ --

Column 14,
Line 4, delete "antenna which require a surface" insert -- antenna which requires a surface --
Line 8, delete "problem of a improper" insert -- problem of an improper --
Line 51, delete "deploy from the within the" insert -- deploy from within the --

Column 15,
Line 2, delete "drive,, the pitch" insert -- drive, the pitch --

UNITED STATES PATENT AND TRADEMARK OFFICE
CERTIFICATE OF CORRECTION

PATENT NO. : 6,441,801 B1
DATED : August 27, 2002
INVENTOR(S) : Byron F. Knight et al.

It is certified that error appears in the above-identified patent and that said Letters Patent is hereby corrected as shown below:

Appendix 3, 2$^{nd}$ Matrix

Delete:

" $S_2[G_B A] : \begin{bmatrix} 1 & \dfrac{\sqrt{3}b}{2} & \dfrac{b}{2} & 0 \\ 1 & \dfrac{a}{a} & 0 & h \end{bmatrix}$ "

Insert:

-- $S_2[G_B A] : \begin{bmatrix} 1 & \dfrac{\sqrt{3}b}{2} & \dfrac{b}{2} & 0 \\ 1 & a & 0 & h \end{bmatrix}$ --

Appendix 3, 3$^{rd}$ Matrix

Delete:

" $S_3[G_B B] : \begin{bmatrix} 1 & \dfrac{\sqrt{3}b}{2} & -\dfrac{b}{2} & 0 \\ 1 & \dfrac{a}{2} & \dfrac{\sqrt{3}a}{2} & h \end{bmatrix}$ "

Insert:

-- $S_3[G_B B] : \begin{bmatrix} 1 & \dfrac{\sqrt{3}b}{2} & \dfrac{b}{2} & 0 \\ 1 & \dfrac{a}{2} & \dfrac{\sqrt{3}a}{2} & h \end{bmatrix}$ --

UNITED STATES PATENT AND TRADEMARK OFFICE
CERTIFICATE OF CORRECTION

PATENT NO.    : 6,441,801 B1
DATED         : August 27, 2002
INVENTOR(S)   : Byron F. Knight et al.

It is certified that error appears in the above-identified patent and that said Letters Patent is hereby corrected as shown below:

Appendix 8,
Equation 12

Delete:

"$\hat{S}_{12}^T = \left[\left(X_F - \frac{\sqrt{3}b}{2}\right)\left(Y_C + \frac{b}{2}\right)h; -\frac{bh}{2} - \frac{\sqrt{3}bh}{2}\frac{b}{2}(\sqrt{3}Y_F + X_F)\right]$"

Insert:

--$\hat{S}_{12}^T = \left[\left(X_F - \frac{\sqrt{3}b}{2}\right)\left(Y_F + \frac{b}{2}\right)h; -\frac{bh}{2} - \frac{\sqrt{3}bh}{2}\frac{b}{2}(\sqrt{3}Y_F + X_F)\right]$--

Signed and Sealed this

Eleventh Day of March, 2003

JAMES E. ROGAN
*Director of the United States Patent and Trademark Office*